(12) United States Patent
Montayre et al.

(10) Patent No.: US 12,514,536 B2
(45) Date of Patent: Jan. 6, 2026

(54) SYSTEMS AND METHODS FOR TRACKING SURGICAL INSTRUMENTS

(71) Applicant: Covidien LP, Mansfield, MA (US)

(72) Inventors: Rommel N. Montayre, Statham, GA (US); Scott J. Prior, Branford, CT (US); Jordan A. Whisler, Brookline, MA (US); Nikolai D. Begg, Wellesley, MA (US)

(73) Assignee: Covidien LP, Mansfield, MA (US)

( * ) Notice: Subject to any disclaimer, the term of this patent is extended or adjusted under 35 U.S.C. 154(b) by 293 days.

(21) Appl. No.: 18/080,098

(22) Filed: Dec. 13, 2022

(65) Prior Publication Data

US 2024/0188928 A1 Jun. 13, 2024

(51) Int. Cl.
*A61B 8/08* (2006.01)
*A61B 8/00* (2006.01)

(52) U.S. Cl.
CPC ............ *A61B 8/085* (2013.01); *A61B 8/4254* (2013.01)

(58) Field of Classification Search
CPC .............................. A61B 8/085; A61B 8/4254
See application file for complete search history.

(56) References Cited

U.S. PATENT DOCUMENTS

| | | | |
|---|---|---|---|
| 5,166,787 A | 11/1992 | Irion | |
| 5,351,678 A | 10/1994 | Clayton | |
| 5,935,057 A | 8/1999 | Lichtman et al. | |
| 6,174,307 B1 | 1/2001 | Daniel et al. | |
| 6,896,657 B2 | 5/2005 | Willis | |
| 6,936,048 B2 | 8/2005 | Hurst | |
| 7,517,346 B2 | 4/2009 | Sloan et al. | |
| 7,591,785 B2 | 9/2009 | Wendlandt et al. | |
| 7,621,869 B2 | 11/2009 | Ratnakar | |
| 7,815,571 B2 | 10/2010 | Deckman et al. | |
| 7,874,986 B2 | 1/2011 | Deckman et al. | |
| 7,918,795 B2 | 4/2011 | Grossman | |
| 8,088,072 B2 | 1/2012 | Munrow et al. | |
| 8,206,300 B2 | 6/2012 | Deckman et al. | |
| 8,262,574 B2 | 9/2012 | Placek et al. | |
| 8,262,577 B2 | 9/2012 | Munrow et al. | |
| 8,298,145 B2 | 10/2012 | Deckman et al. | |
| 8,506,485 B2 | 8/2013 | Deckman et al. | |
| 8,992,427 B2 | 3/2015 | Munrow et al. | |

(Continued)

OTHER PUBLICATIONS

Extended European Search Report issued in corresponding European Application No. 23215498.9 dated Apr. 16, 2024, 9 pages.

*Primary Examiner* — Chao Sheng
(74) *Attorney, Agent, or Firm* — Carter, DeLuca & Farrell LLP

(57) ABSTRACT

A system for tracking a surgical instrument includes a pattern and a sensor assembly. The pattern is configured for positioning on a first surgical instrument and has a plurality of first markers longitudinally spaced relative to one another and a plurality of second markers circumferentially spaced relative to one another. The sensor assembly is configured to operably couple to a second surgical instrument and includes at least one sensor. The at least one sensor is configured to detect at least one of the first markers, thereby enabling determination of longitudinal translation of the first surgical instrument relative to the second surgical instrument, and to detect an at least one of the second markers, thereby enabling determination of rotation of the first surgical instrument relative to the second surgical instrument.

20 Claims, 11 Drawing Sheets

(56) References Cited

U.S. PATENT DOCUMENTS

| | | |
|---|---|---|
| 9,357,977 B2 | 6/2016 | Grossman |
| 9,517,047 B2 | 12/2016 | Grossman |
| 9,808,310 B2 | 11/2017 | Grossman |
| 9,861,336 B2 | 1/2018 | Munrow et al. |
| 9,987,080 B2 | 6/2018 | Grossman |
| 10,058,342 B2 | 8/2018 | Deckman et al. |
| 10,182,862 B2 | 1/2019 | Grossman |
| 10,321,951 B2 | 6/2019 | Placek et al. |
| 10,595,819 B2 | 3/2020 | Deckman et al. |
| 10,610,197 B2 | 4/2020 | Deckman et al. |
| 10,750,939 B2 | 8/2020 | Begg |
| 2004/0181152 A1 | 9/2004 | Zhang et al. |
| 2005/0203399 A1 | 9/2005 | Vaezy et al. |
| 2005/0234294 A1 | 10/2005 | Saadat et al. |
| 2005/0272975 A1 | 12/2005 | McWeeney et al. |
| 2007/0213749 A1 | 9/2007 | Kogasaka |
| 2009/0259097 A1 | 10/2009 | Thompson |
| 2009/0318758 A1 | 12/2009 | Farr et al. |
| 2011/0160535 A1 | 6/2011 | Bayer et al. |
| 2012/0245416 A1 | 9/2012 | Viola |
| 2013/0046137 A1 | 2/2013 | Zhao et al. |
| 2013/0261392 A1 | 10/2013 | Yamamoto et al. |
| 2014/0180001 A1 | 6/2014 | von Grunberg et al. |
| 2014/0228875 A1 | 8/2014 | Saadat |
| 2015/0208947 A1 | 7/2015 | Tojo |
| 2015/0265367 A1 | 9/2015 | Gruhler |
| 2017/0245838 A1 | 8/2017 | Munrow et al. |
| 2017/0245891 A1 | 8/2017 | Munrow et al. |
| 2017/0290626 A1 | 10/2017 | Deckman et al. |
| 2017/0290627 A1 | 10/2017 | Deckman et al. |
| 2018/0008237 A1 | 1/2018 | Venkataraman et al. |
| 2018/0042572 A1 | 2/2018 | Munrow et al. |
| 2018/0078303 A1 | 3/2018 | Grossman |
| 2018/0132927 A1 | 5/2018 | Chen et al. |
| 2018/0318026 A1 | 11/2018 | Placek |
| 2019/0192217 A1 | 6/2019 | Grossman |
| 2019/0262080 A1 | 8/2019 | Hammudi et al. |
| 2019/0269456 A1 | 9/2019 | Placek et al. |
| 2019/0350648 A1 | 11/2019 | Owens et al. |
| 2020/0229892 A1 | 7/2020 | Munrow et al. |
| 2020/0275975 A1 | 9/2020 | Chen |
| 2021/0251695 A1 | 8/2021 | Loo |

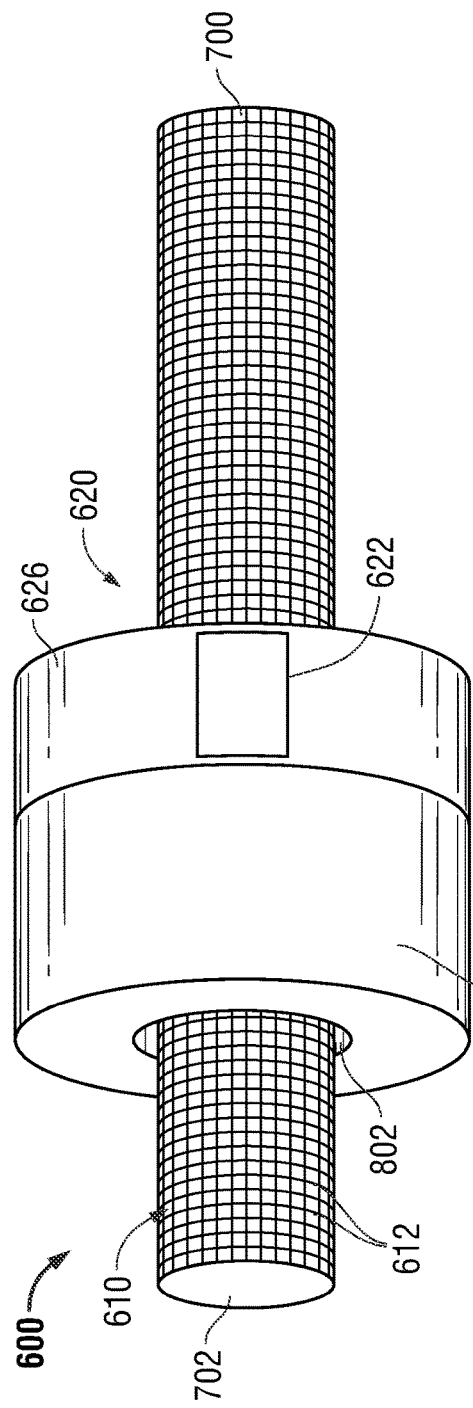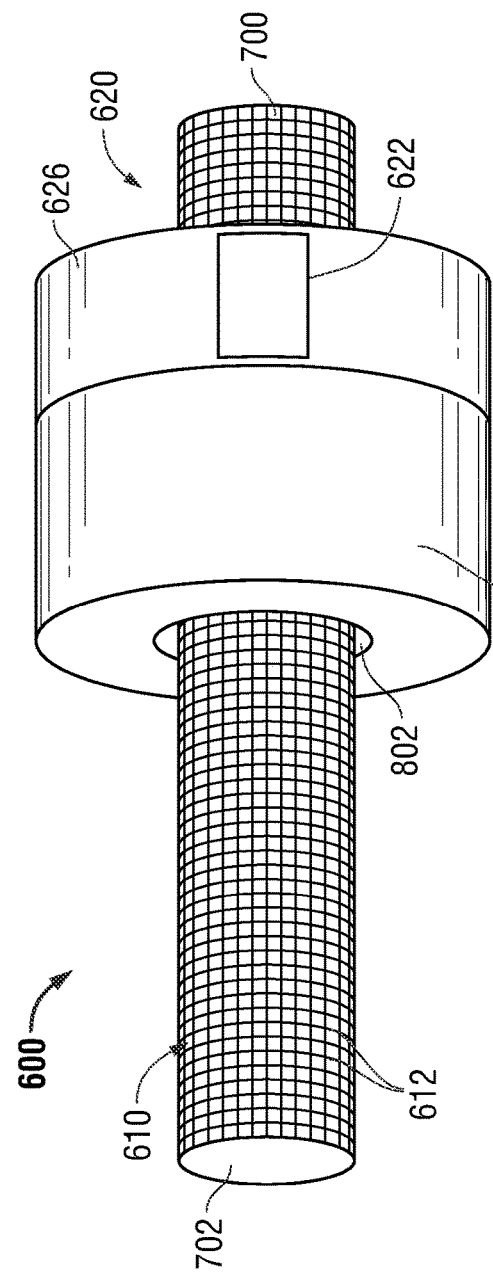
FIG. 6A
FIG. 6B

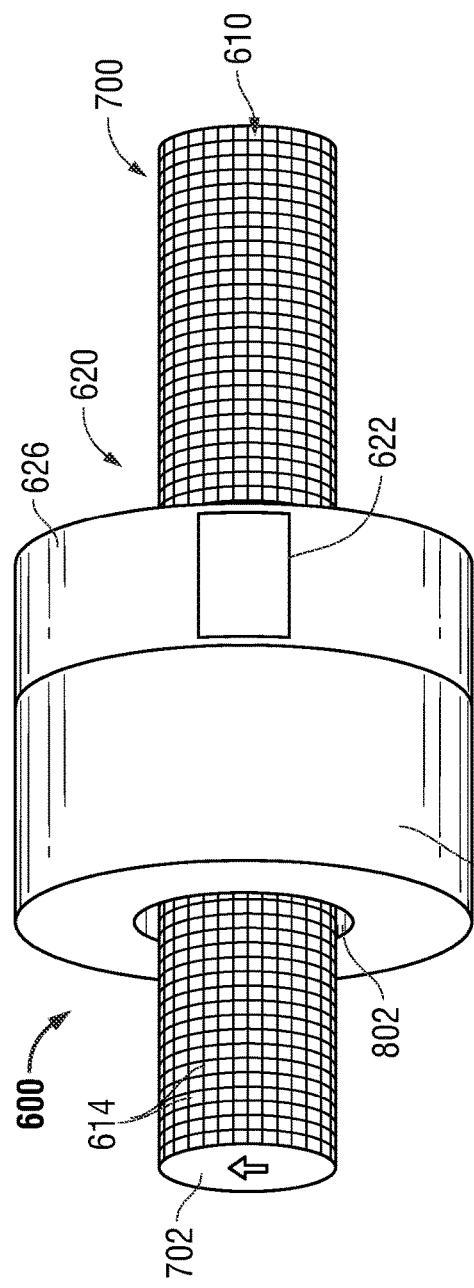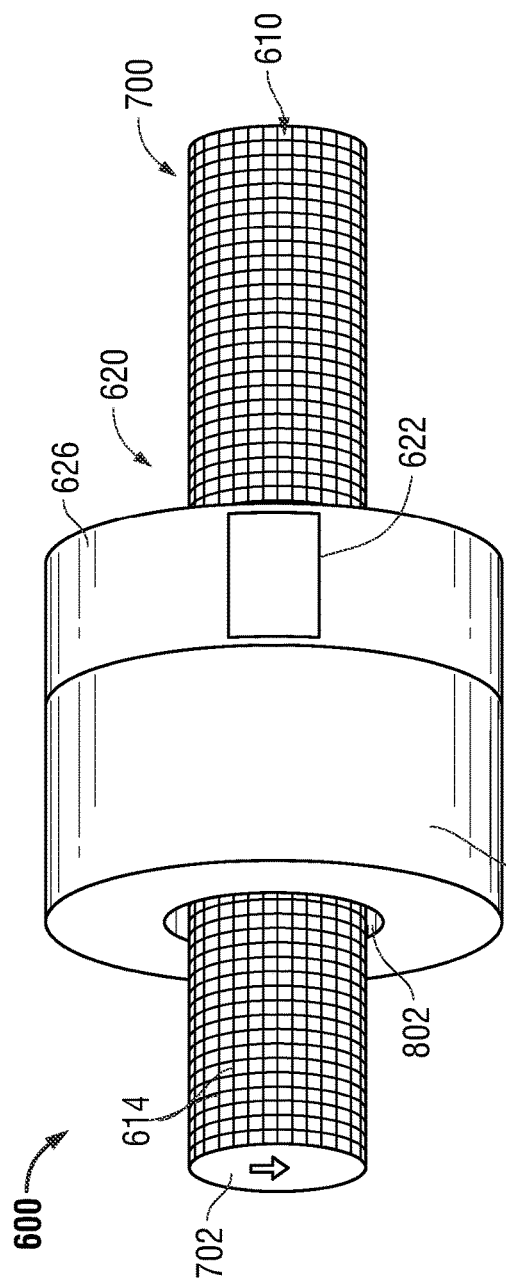

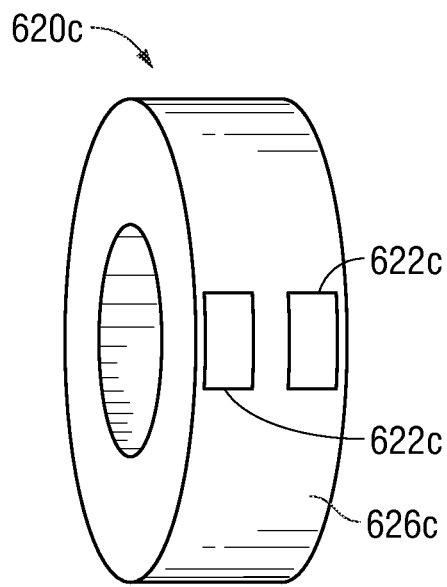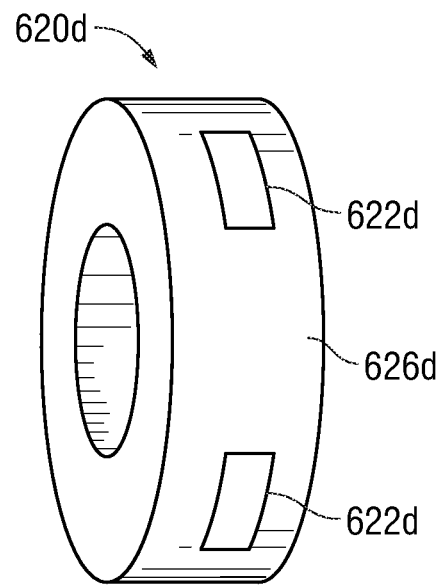
FIG. 8C  FIG. 8D
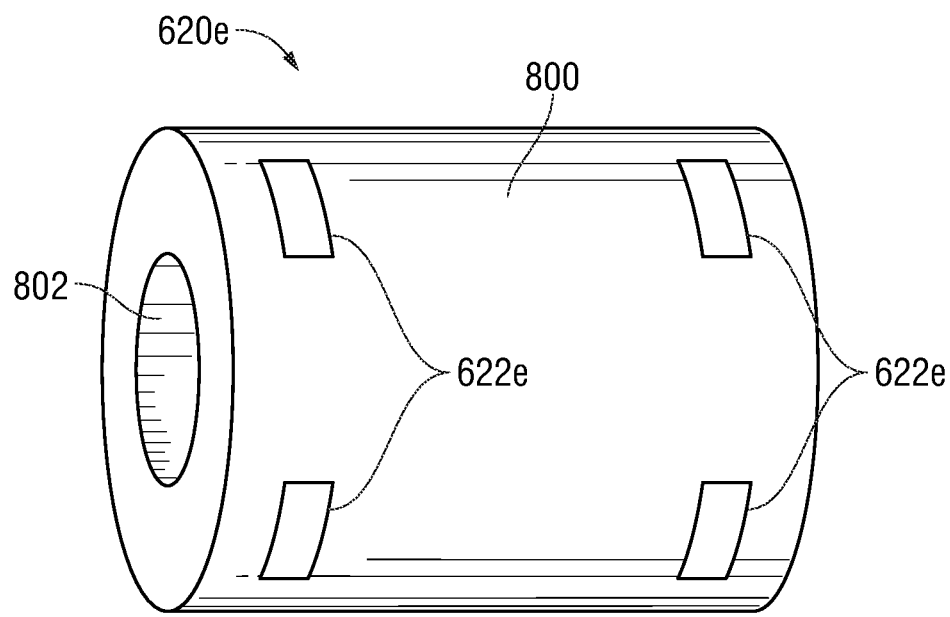
FIG. 8E

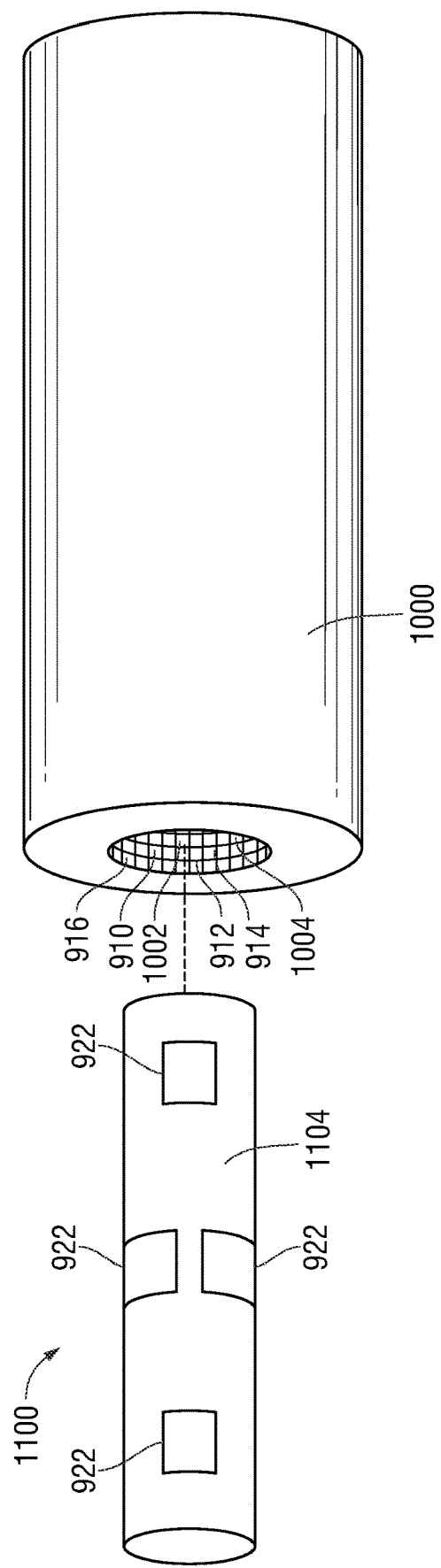

SYSTEMS AND METHODS FOR TRACKING SURGICAL INSTRUMENTS

FIELD

The present disclosure relates to systems, and methods for tracking of surgical instruments and, more specifically, to systems and methods for linear and rotational tracking of surgical instruments.

BACKGROUND

Tracking surgical instruments during surgical procedures facilitates performing the surgical procedures and increases patient safety. For example, with respect to transvaginal hysteroscopic surgical procedures, instrument tracking facilitates positioning an instrument at particular anatomical location (e.g., within the vagina, vaginal fornix, cervix, uterus, uterine wall, or in any other suitable for location) and relative to tissue of interest to operate on (e.g., cut, ablate, observe, biopsy, remove, join, treat (thermally, electrically, mechanically, and/or chemically), etc.), the tissue of interest while avoiding damage to surrounding tissue.

SUMMARY

As used herein, the term "distal" refers to the portion that is being described which is farther from an operator (whether a human surgeon or a surgical robot), while the term "proximal" refers to the portion that is being described which is closer to the operator. Terms including "generally," "about," "substantially," and the like, as utilized herein, are meant to encompass variations, e.g., manufacturing tolerances, material tolerances, use and environmental tolerances, measurement variations, design variations, and/or other variations, up to and including plus or minus 10 percent. Further, to the extent consistent, any of the aspects described herein may be used in conjunction with any or all of the other aspects described herein.

Provided in accordance with aspects of the present disclosure is a system for tracking a surgical instrument that includes a pattern and a sensor assembly. The pattern is on a first surgical instrument and has a plurality of first markers longitudinally spaced relative to one another and a plurality of second markers circumferentially spaced relative to one another. The sensor assembly is configured to operably coupled to a second surgical instrument and includes at least one sensor. The at least one sensor is configured to detect the at least one first marker of the plurality of first markers, thereby enabling determination of longitudinal translation of the first surgical instrument relative to the second surgical instrument and to detect the intersection of at least one second marker of the plurality of second markers, thereby enabling determination of rotation of the first surgical instrument relative to the second surgical instrument.

In an aspect of the present disclosure, the at least one sensor includes at least one first sensor configured to detect the at least one first marker of the plurality of first markers, and at least one second sensor configured to detect the at least one second marker of the plurality of second markers.

In another aspect of the present disclosure, the at least one sensor includes at least two first sensors. Each sensor of the at least two first sensors is configured to detect the at least one first marker of the plurality of first markers. The at least two first sensors are longitudinally spaced relative to one another.

In still another aspect of the present disclosure, the at least two first sensors enable determination of a direction of the longitudinal translation of the first surgical instrument relative to the second surgical instrument.

In yet another aspect of the present disclosure, the at least one sensor includes at least two second sensors. Each of the at least two second sensors is configured to detect the at least one second marker of the plurality of second markers. The at least two second sensors are circumferentially spaced relative to one another.

In still yet another aspect of the present disclosure, the at least two second sensors enable determination of a direction of the rotation of the first surgical instrument relative to the second surgical instrument.

In another aspect of the present disclosure, the at least one sensor is an optical sensor and the plurality of first markers is optically distinct from the plurality of second markers.

A surgical system for surgical instrument tracking provided in accordance with the present disclosure includes a first surgical instrument, a second surgical instrument, and a sensor assembly. The first surgical instrument includes a pattern having a plurality of first markers arranged for detection in response to longitudinal translation of the first surgical instrument, and a plurality of second markers arranged for detection in response to rotation of the first surgical instrument. The second surgical instrument is configured to guide the first surgical instrument such that the first surgical instrument is permitted to translate longitudinally and rotate relative to the second surgical instrument and such that the first surgical instrument is constrained relative to the second surgical instrument in at least one other degree of freedom. The sensor assembly is operably coupled to the second surgical instrument and includes at least one sensor defining a sensing region. The at least one sensor is configured to detect at least one first marker of the plurality of first markers, thereby enabling determination of longitudinal translation of the first surgical instrument relative to the second surgical instrument, and to detect at least one second marker of the plurality of second markers, thereby enabling determination of rotation of the first surgical instrument relative to the second surgical instrument.

In an aspect of the present disclosure, the second surgical instrument defines a passage configured to receive at least a portion of the first surgical instrument, and the first surgical instrument is configured to longitudinally translate and rotate within and relative to the passage of the second surgical instrument.

In another aspect of the present disclosure, a sensing region of the at least one sensor intersects the passage or an extension volume of the passage.

In still another aspect of the present disclosure, the pattern is disposed on an exterior cylindrical surface of the first surgical instrument.

In another aspect of the present disclosure, the sensor assembly is integrated into the second surgical instrument. Alternatively, the sensor assembly may be removably coupled to the second surgical instrument.

In yet another aspect of the present disclosure, the at least one sensor includes at least one first sensor configured to detect the at least one first marker of the plurality of first markers, and at least one second sensor configured to detect the at least one second marker of the plurality of second markers.

In still yet another aspect of the present disclosure, the at least one sensor includes at least two first sensors each configured to detect the at least one first marker of the plurality of first markers, and at least two second sensors each configured to detect the at least one second marker of the plurality of second markers.

In another aspect of the present disclosure, the at least two first sensors enable determination of a direction of the longitudinal translation of the first surgical instrument relative to the second surgical instrument and/or the at least two second sensors enable determination of a direction of the rotation of the first surgical instrument relative to the second surgical instrument.

In another aspect of the present disclosure, the at least one sensor is an optical sensor and the plurality of first markers is optically distinct from the plurality of second markers.

A method of tracking a surgical instrument in accordance with the present disclosure includes: determining longitudinal translation of a first surgical instrument relative to a second surgical instrument by detecting at least one first marker associated with the first surgical instrument with at least one first sensor associated with the second surgical instrument; and determining rotation of the first surgical instrument relative to the second surgical instrument by detecting at least one second marker associated with the first surgical instrument with at least one second sensor associated with the second surgical instrument.

In an aspect of the present disclosure, determining the longitudinal translation of the first surgical instrument relative to the second surgical instrument includes determining longitudinal translation of the first surgical instrument through a passage defined by the second surgical instrument, and determining the rotation of the first surgical instrument relative to the second surgical instrument includes determining rotation of the first surgical instrument within the passage defined by the second surgical instrument.

In another aspect of the present disclosure, the method further includes determining a direction of the longitudinal translation of the first surgical instrument relative to the second surgical instrument and/or determining a direction of the rotation of the first surgical instrument relative to the second surgical instrument.

BRIEF DESCRIPTION OF DRAWINGS

The above and other aspects and features of the present disclosure will become more apparent in view of the following detailed description when taken in conjunction with the accompanying drawings wherein like reference numerals identify similar or identical elements.

FIGS. 6A and 6B illustrate the tracking system of FIG. 5 tracking longitudinal translation of the first surgical instrument relative to the second surgical instrument;

FIGS. 7A and 7B illustrate the tracking system of FIG. 5 tracking rotation of the first surgical instrument relative to the second surgical instrument;

FIGS. 8A-8E are perspective views of other sensor assemblies configured for use with the tracking system of FIG. 5; and FIG. 9 is a perspective view of another tracking system in accordance with the present disclosure configured to track a first surgical instrument relative to a second surgical instrument.

DETAILED DESCRIPTION

Figure 1:
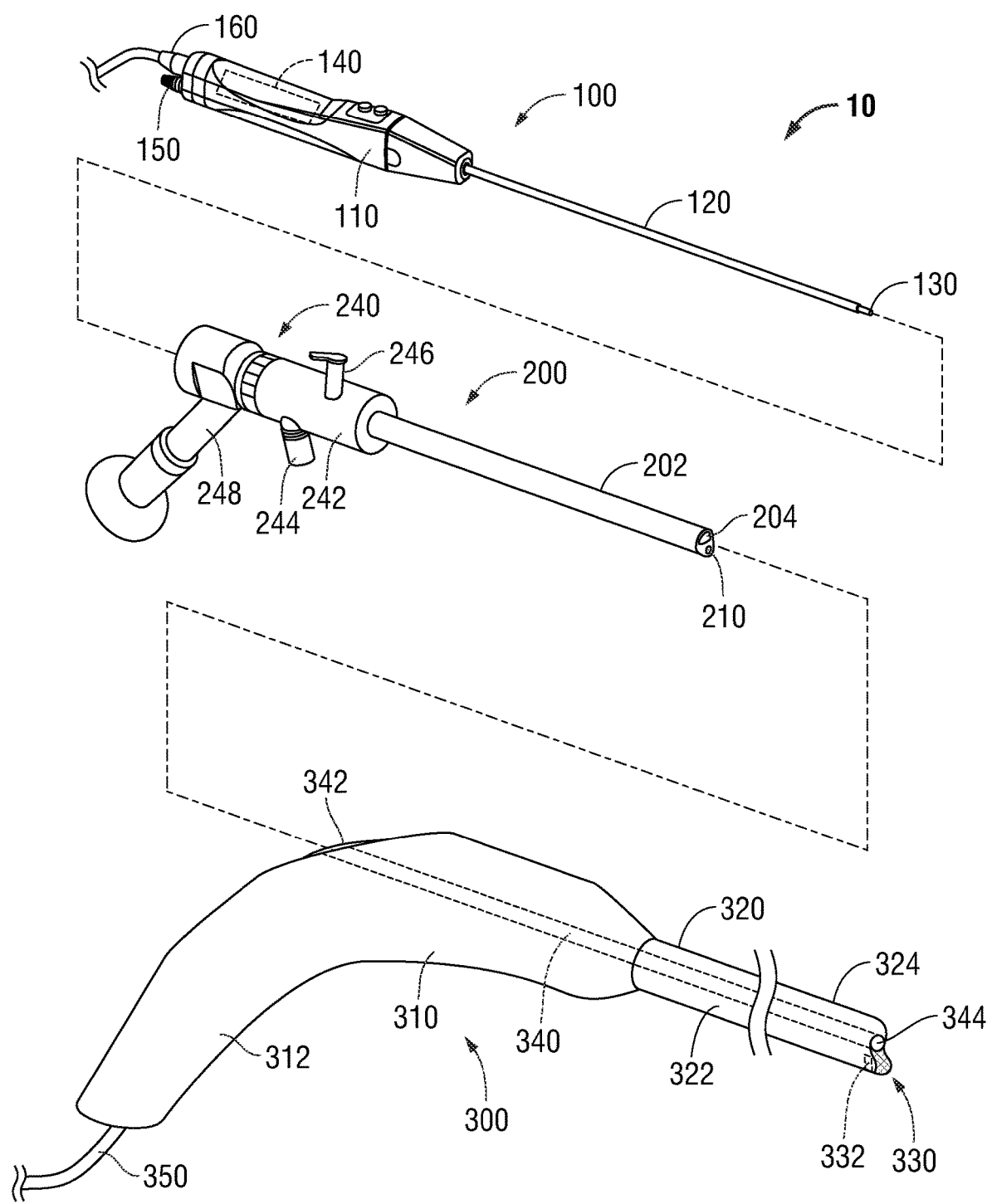
FIG. 1 is an exploded, perspective view of a surgical system in accordance with the present disclosure.

Referring to FIG. 1, a surgical system provided in accordance with the present disclosure is shown generally identified by reference numeral 10. System 10 includes at least two surgical instruments 100, 200, 300 configured to operably couple to one another such that relative movement therebetween is constrained in at least one degree of freedom and such that relative movement therebetween is permitted in at least two degrees of freedom. For example, surgical instrument 100 may be configured for insertion through surgical instrument 200 such that rotation and axial translation of surgical instrument 100 relative to surgical instrument 200 are permitted while transverse motion and tilting of surgical instrument 100 relative to surgical instrument 200 in at least one degree of freedom are substantially constrained. Additionally or alternatively, surgical instrument 200 may be configured for insertion through surgical instrument 300 such that rotation and axial translation of surgical instrument 200 relative to surgical instrument 300 are permitted while transverse motion and tilting of surgical instrument 200 relative to surgical instrument 300 in at least one degree of freedom are substantially constrained.

As detailed below, the present disclosure provides devices, systems, and methods for linear and rotational tracking of surgical instruments (e.g., between surgical instruments 100 and 200 and/or between surgical instruments 200 and 300). System 10, as well as the other surgical systems provided herein, are detailed herein as hysteroscopic surgical systems configured for use in hysteroscopic surgical procedures; however, it is understood that the aspects and features of the present disclosure may be utilized in any suitable surgical system. Further, while exemplary instruments 100, 200, 300 are detailed herein, it is likewise understood that the aspects and features of the present disclosure also to apply to any suitable surgical instruments and combinations of surgical instruments including less than or greater than three instruments.

Continuing with reference to FIG. 1, system 10 includes: a working instrument 100 (e.g., a tissue resection device, an ablation device, a biopsy device, a surgical grasper, a surgical stapler, an electrosurgical instrument, etc.); an access instrument 200 (e.g., an endoscope, a cannula, a sheath, etc.) which may also provide visualization capabilities (e.g., in aspects where access instrument 200 is an endoscope or visualization cannula); and, in aspects, a guide instrument 300 which may also provide imaging capabilities (e.g., in aspects where guide instrument 300 is an ultrasound device). With respect to system 10 configured for use in hysteroscopic surgical procedures, as shown in FIG. 1, for example, access instrument 200 may be a hysteroscope (thus also providing visualization capabilities) and/or guide instrument 300 may be an ultrasound device (thus also providing imaging capabilities). Further, for use in hysteroscopic surgical procedures, guide instrument 300 may be configured for trans-vaginal insertion into position adjacent to or in abutment with the cervix, while access instrument 200 is configured for insertion through guide instrument 300 and the cervix into the uterus. Working instrument 100, in such configurations, is configured for insertion through access instrument 200 and into the uterus to perform a surgical procedure in the uterine cavity and/or within the uterine wall.

Working instrument 100 is illustrated in FIG. 1 as a tissue resection device including, for example, a housing 110, a shaft 120, a cutting member 130, a drive mechanism 140, an outflow port 150, and a cable 160. Housing 110 houses drive mechanism 140 therein and functions as a handle to enable a user to grasp working instrument 100, although housing 110 may alternatively mount on a surgical robot arm (not shown). Drive mechanism 140 includes a motor (not shown) and is operably coupled to cutting member 130 to drive rotation and/or translation of cutting member 130 relative to shaft 120. Drive mechanism 140 is adapted to connect to a control unit (not shown) via cable 160 for powering and controlling the motor, although working instrument 100 may alternatively be battery powered or manually powered. A suction source (not shown) incorporated into the control unit, or any other suitable vacuum-creating mechanism, may also be provided to facilitate withdrawal of fluid, tissue, and debris through working instrument 100 and outflow tube 150. Other suitable working instruments are also contemplated such as, for example, an ablation instrument or any other suitable surgical instrument configured to operate on (e.g., cut, ablate, observe, biopsy, remove, join, treat (thermally, electrically, mechanically, and/or chemically), etc.) tissue of interest.

Shaft 120 of working instrument 100 extends distally from housing 110 and, in embodiments, is stationary relative to housing 110, although other configurations are also contemplated. Shaft 120 defines a window through a sidewall thereof towards a distal end of shaft 120 to provide access to cutting member 130 which is rotatably and/or translatably disposed within shaft 120 and, as noted above, operably coupled to drive mechanism 140. Cutting member 130 defines an opening providing access to the interior thereof and may include a serrated cutting edge surrounding the opening, although other suitable cutting edge configurations are also contemplated. Alternatively or additionally, shaft 120 may include a cutting edge defined about the window thereof.

In use of working instrument 100, upon activation, tissue is drawn through the window of shaft 120 and into the opening of cutting member 130, e.g., under vacuum. As tissue is drawn into the opening of cutting member 130, the tissue is resected via the rotation and/or translation of cutting member 130 relative to shaft 120, thus enabling the resected tissue to be drawn proximally through cutting member 130, along with fluid and debris. The resected tissue, fluid, and debris are drawn proximally under vacuum through cutting member 130, through outflow port 150, and through outflow tubing (not shown) and, ultimately, to one or more collection canisters of a fluid management system (not shown).

Referring still to FIG. 1, access instrument 200 may be configured as a hysteroscope including an elongated tubular member 202 and a proximal body 240. Elongated tubular member 202 defines a working channel 204 configured to receive a working instrument therethrough, e.g., working instrument 100. Working channel 204 may also serve as a fluid inflow (or outflow) channel. Alternatively or additionally, a separate fluid inflow (or outflow) channel may be provided. Elongated tubular member 202 further includes optics 210 extending therethrough to enable visualization at the distal end of elongated tubular member 202.

Proximal body 240 includes a housing 242, a light post 244, a valve 246, and an arm 248. Light post 244 extends from housing 242 and is configured to connect to a light source, e.g., to illuminate a distal end of elongated tubular member 202 via one or more fiber optic strands (not shown) coupled to light post 244 and extending through elongated tubular member 202. Valve 246 is disposed in fluid communication with working channel 204 and is configured to enable the selective inflow and/or outflow of fluid to/from working channel 204. In configurations where multiple flow channels are provided, multiple valves may likewise be provided. Arm 248 is configured to connect to an imaging device, e.g., a camera, to capture images received via optics 210 and, thus, enable display of a video image of an internal surgical site as captured by optics 210.

Guide instrument 300 may be configured as an ultrasound device including a proximal body 310, a shaft 320 extending distally from proximal body 310, and an ultrasound sensor assembly 330 disposed at a distal end portion 324 of shaft 320. Guide instrument 300 further includes a longitudinal lumen 340 defined through proximal body 310 and shaft 320 and including an open proximal end 342 and an open distal end 344. Longitudinal lumen 340 may be coaxial with a longitudinal axis defined through shaft 320 or may be offset and/or angled relative thereto. Longitudinal lumen 340 is configured to permit passage of at least a portion of elongated tubular member 202 of access instrument 200 therethrough such that a distal portion of the elongated tubular member 202 extends through open distal end 344 of longitudinal lumen 340 and distally from shaft 320. Longitudinal lumen 340 may additionally or alternatively be configured to permit passage of other instrumentation, e.g., one or more working instruments, therethrough.

Proximal body 310 of guide instrument 300 may be configured as a handle including, for example, a pistol-style grip 312, although other handle configurations are also contemplated as are non-handle configurations, e.g., for mounting guide instrument 300 and/or attaching guide instrument 300 to a surgical robot arm. A cable 350 extends from proximal body 310 to connect ultrasound sensor assembly 330 to an ultrasound console (not shown), e.g., via wires (not shown) extending from ultrasound sensor assembly 330 through shaft 320, proximal body 310, and cable 350.

Shaft 320 of guide instrument 300 is configured for trans-vaginal insertion into position adjacent or in abutment with the cervix such that distal end 344 of longitudinal lumen 340 is oriented towards the cervical canal to enable passage of access instrument 200 (or other suitable surgical instrumentation) through longitudinal lumen 340, out distal end 344 thereof, through the cervical canal, and into the uterus. A body portion 322 of shaft 320 may define a cylindrical-shaped configuration and/or distal end portion 324 of shaft 320 may be tapered, curved, and/or otherwise atraumatically configured to facilitate atraumatic insertion.

Ultrasound sensor assembly 330 includes one or more ultrasound sensors 332, e.g., ultrasound transducers, to enable ultrasound imaging of tissue, e.g., the uterus. Each ultrasound sensor 332 is configured to emit ultrasound waves, e.g., high-frequency sound waves, and to receive echoed waves produced by the reflection of the ultrasound waves against the various tissue structures encountered. The echoed waves received by each ultrasound sensor 332 are output to an image processing unit (not shown), e.g., by way of wires extending through shaft 320, proximal body 310, and cable 350. In aspects, ultrasound sensor assembly 330 may be configured for 2D ultrasound imaging. In other aspects, ultrasound sensor assembly 330 includes a plurality of ultrasound sensors 332 forming an ultrasound sensor array that defines a portion of a circle, a portion of a polygon, a partially-polygonal, partially-arcuate configuration, or other suitable configuration to enable reconstruction of a 3D ultrasound image therefrom for 3D ultrasound imaging. In this manner, when activated, ultrasound sensor assembly 330 enables ultrasound imaging of tissue, e.g., the cervix, uterus, and/or surrounding tissue.

Figure 2:
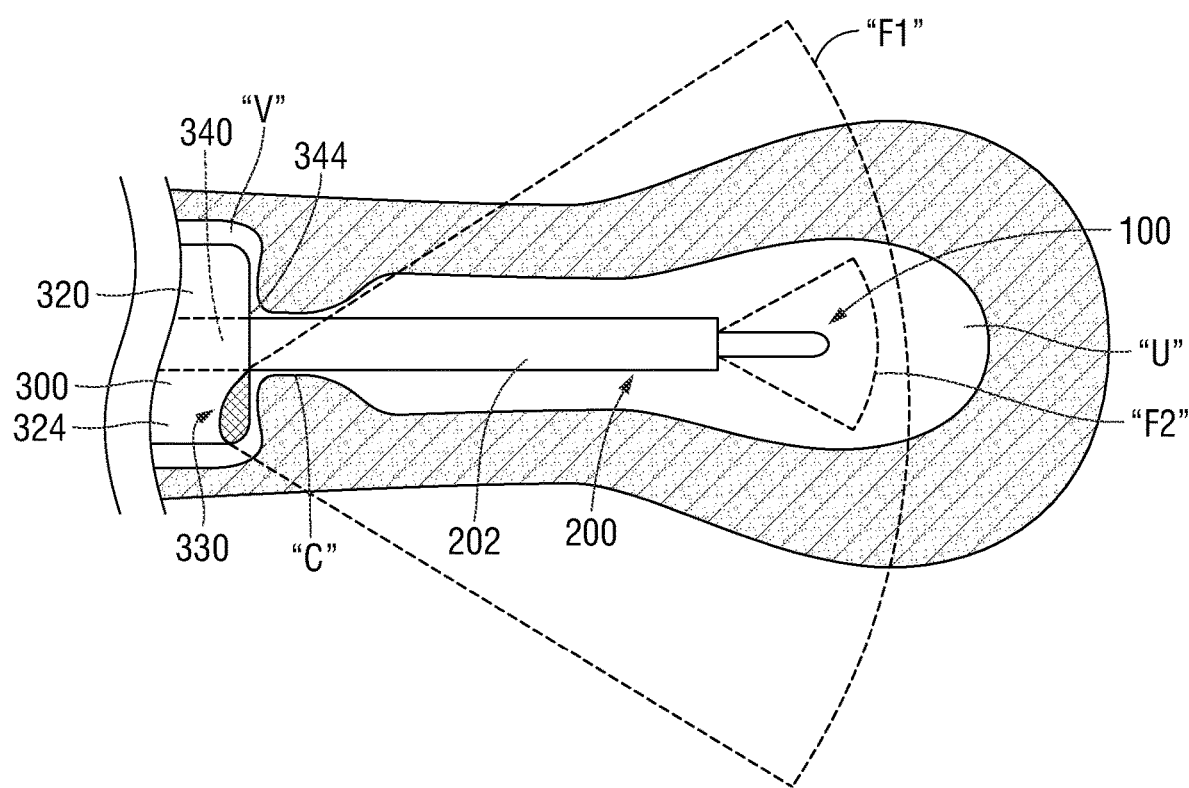
FIG. 2 is a side, partial cross-sectional view of the system of FIG. 1 positioned intra-vaginally for performing a procedure on or within a uterus.

Turning to FIG. 2, system 10 is shown in use wherein guide instrument 300 is inserted trans-vaginally through the vaginal canal "V" such that distal end portion 324 of shaft 320 thereof is disposed adjacent to or in abutment with the cervix "C." In this position, more specifically, ultrasound sensor assembly 330 is positioned adjacent to or in abutment with the cervix "C" to enable ultrasound imaging of a field of view "F1" including the uterus "U" and surrounding tissue. Further, in this position, open distal end 344 of longitudinal lumen 340 is oriented in alignment with the cervical canal and elongated tubular member 202 extends therefrom, through the cervix "C" and into the uterus "U." In this manner, access instrument 200 may be utilized for visualization within the uterus "U," e.g., providing a field of view "F2," together with or separately from the ultrasound imaging. Access instrument 200 may also be used for the introduction of fluid into and/or the removal of fluid from the uterus "U" and/or for passage of a working instrument 100, e.g., a tissue resection device, ablation device, biopsy device, etc., therethrough and into the uterus "U" to perform one or more hysteroscopic tasks therein (e.g., within the uterus "U") or therethrough (e.g., within the uterine wall). The use of ultrasound imaging of the uterus "U" from the exterior thereof and/or visualization of the uterus "U" from within the uterine cavity provides increased visibility for performing various different hysteroscopic tasks without the need to swap out instruments supporting different imaging modalities and/or providing different imaging perspectives.

Referring generally to FIGS. 1 and 2, as noted above, longitudinal lumen 340 of guide instrument 300 is configured to permit passage of at least a portion of elongated tubular member 202 of access instrument 200 therethrough. More specifically, access instrument 200 is configured for telescopic insertion through longitudinal lumen 340 of guide instrument 300 such that rotation and axial translation of access instrument 200 relative to guide instrument 300 are permitted while transverse motion and tilting of access instrument 200 relative to guide instrument 300 are substantially constrained. Thus, access instrument 200, when inserted through longitudinal lumen 340 of guide instrument 300, is only permitted to rotate relative to guide instrument 300 or axially translate through guide instrument 300.

Similarly with respect to working instrument 100 and access instrument 200, working channel 204 of access instrument 200 is configured to permit passage of at least a portion of shaft 120 of working instrument 100 therethrough. More specifically, working instrument 100 is configured for telescopic insertion through working channel 204 of access instrument 200 such that rotation and axial translation of working instrument 100 relative to access instrument 200 are permitted while transverse motion and tilting of working instrument 100 relative to access instrument 200 are substantially constrained. Thus, working instrument 100, when inserted through working channel 204 of access instrument 200, is only permitted to rotate relative to access instrument 200 or axially translate through access instrument 200.

Figure 3:
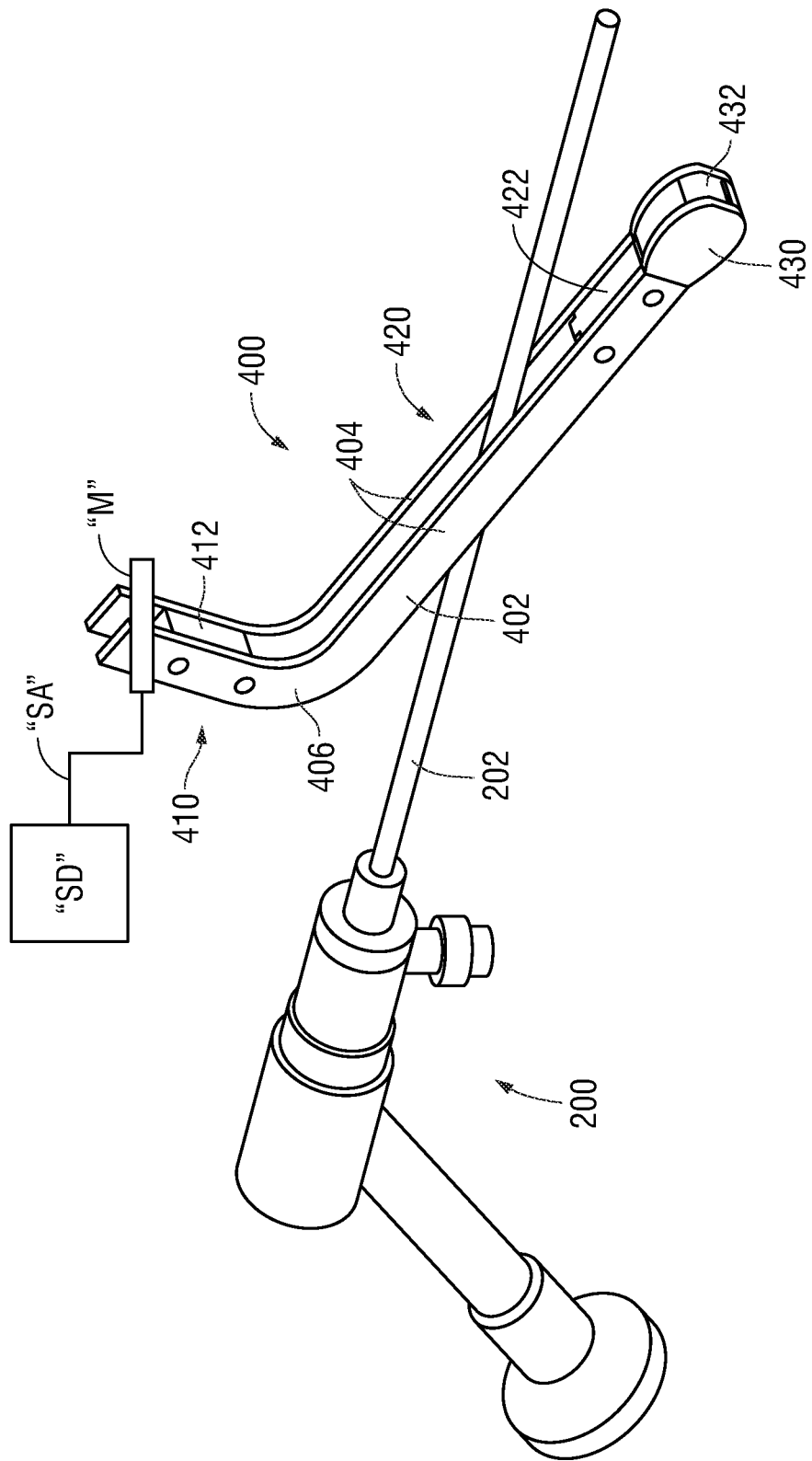
FIG. 3 is a perspective view of another surgical system in accordance with the present disclosure.

Turning to FIG. 3, other configurations of the access instrument and/or guide instrument to provide additional or alternative degrees of freedom of an instrument inserted therethrough and/or to constrain additional or alternative degrees of freedom of an instrument inserted therethrough are also contemplated. For example, FIG. 3 illustrates a guide instrument 400 provided in accordance with the present disclosure including access instrument 200 operably inserted therethrough.

Guide instrument 400 includes a frame 402 and an ultrasound sensor assembly 430. Frame 402 is formed from a pair of spaced-apart rails 404. Rails 404 may be configured as plates extending in substantially parallel orientation relative to one another, or in any other suitable manner. Rails 404 are bent at a bend 406 to define a more-proximal upright portion 410 and a more-distal longitudinal portion 420 disposed at an angle relative to one another, e.g., from about 60 degrees to about 120 degrees. A proximal spacer 412 is disposed between the rails 404 at upright portion 410 of frame 402 and is secured therebetween such that rails 404 are secured to one another and the spacing between rails 404 along upright portion 410 is maintained. A distal spacer 422 is disposed between the rails 404 at longitudinal portion 420 of frame 402 and is secured therebetween such that rails 404 are secured to one another and the spacing between rails 404 along longitudinal portion 420 is maintained.

The proximal end portion of upright portion 410 of frame 402 may include a handle disposed thereon to facilitate manual manipulation of guide instrument 400 and/or may be configured to be mounted on a support arm "SA" of a support device "SD," e.g., a robotic arm of a surgical system or a mounting arm of a mounting frame, thus obviating the need for a surgeon to manually manipulate guide instrument 400 and/or manually hold guide instrument 400 to retain the position thereof. Suitable mounting hardware "M" may be provided integrally with or attachable to the proximal end portion of upright portion 410 for releasably engaging support arm "SA."

Ultrasound sensor assembly 430 extends distally from the distal end of longitudinal portion 420 of frame 402 and is secured thereto. More specifically, ultrasound sensor assembly 430 may be formed with, attached to, or otherwise fixed relative to distal spacer 422 such that the engagement of distal spacer 422 between rails 404 also secures ultrasound sensor assembly 430 relative to frame 402, or may be secured relative to frame 402, directly or indirectly, in any other suitable manner. Ultrasound sensor assembly 430 includes one or more ultrasound sensors 432 and may be configured similar to and/or include any of the features of ultrasound sensor assembly 330 (FIGS. 1 and 2), as detailed above.

Bend 406 of frame 402 enables insertion of elongated tubular member 202 of access instrument 200 between rails 404 in substantially coaxial or parallel orientation relative to the longitudinal axis defined by longitudinal portion 420 of frame 402. Alternatively, elongated tubular member 202 of access instrument 200 may be inserted between rails 404 at an angle relative to the longitudinal axis. Regardless of the angle of insertion, with elongated tubular member 202 of access instrument 200 extending between rails 404, rails 404 serve to substantially inhibit transverse motion and tilting of elongated tubular member 202 in a first direction (laterally, from the orientation illustrated in FIG. 3) that is perpendicular to the longitudinal axis defined by longitudinal portion 420 of frame 402, while permitting transverse motion and tilting of elongated tubular member 202 in a second direction (vertically, from the orientation illustrated in FIG. 3) that is perpendicular to the longitudinal axis and the first direction. Frame 402 also permits rotation and longitudinal translation of elongated tubular member 202 relative to the longitudinal axis defined by longitudinal portion 420 of frame 402. Thus, access instrument 200, when inserted between rails 404 of guide instrument 400, is only permitted to rotate relative to guide instrument 400, longitudinally translate through guide instrument 400, and move and tilt transversely relative to guide instrument 400 in one direction perpendicular to the longitudinal axis of longitudinal portion 420 of frame 402.

Figure 4B:
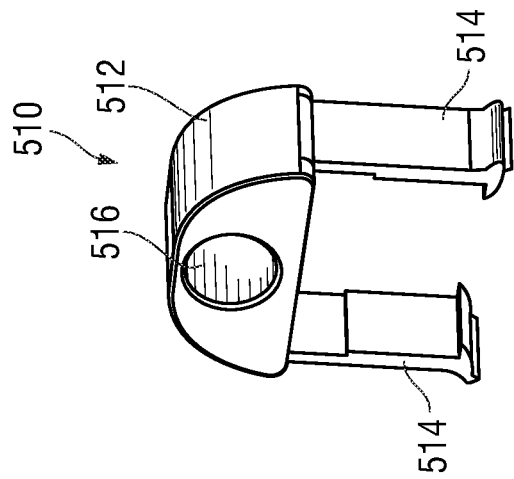
FIG. 4B is a perspective view of a guide piece of the guide instrument of FIG. 4A.
Figure 4A:
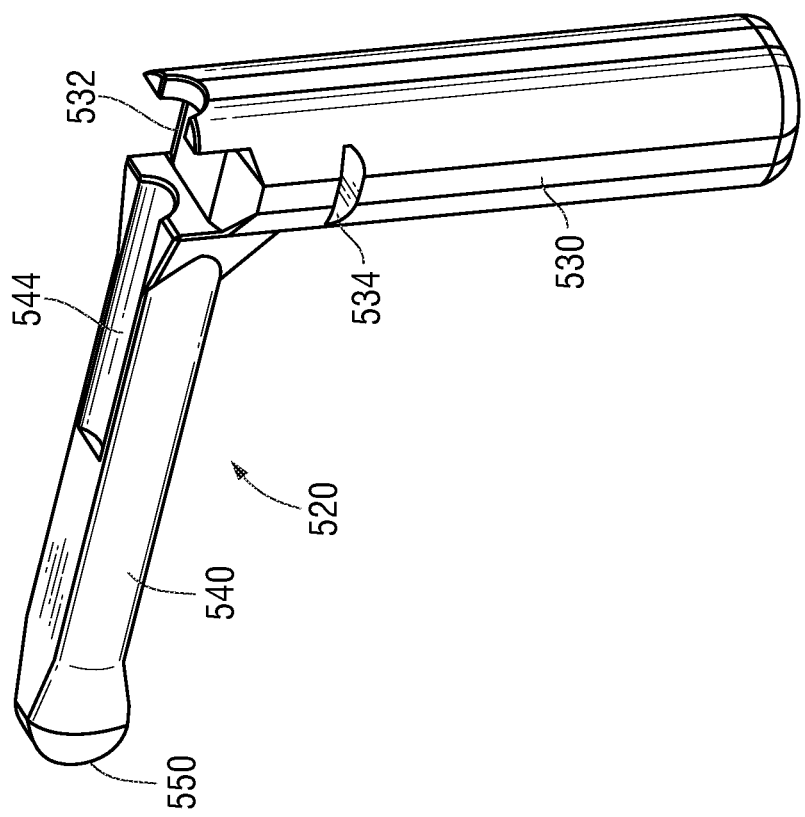
FIG. 4A is a perspective view of a body of a guide instrument in accordance with the present disclosure.
Figure 4C:
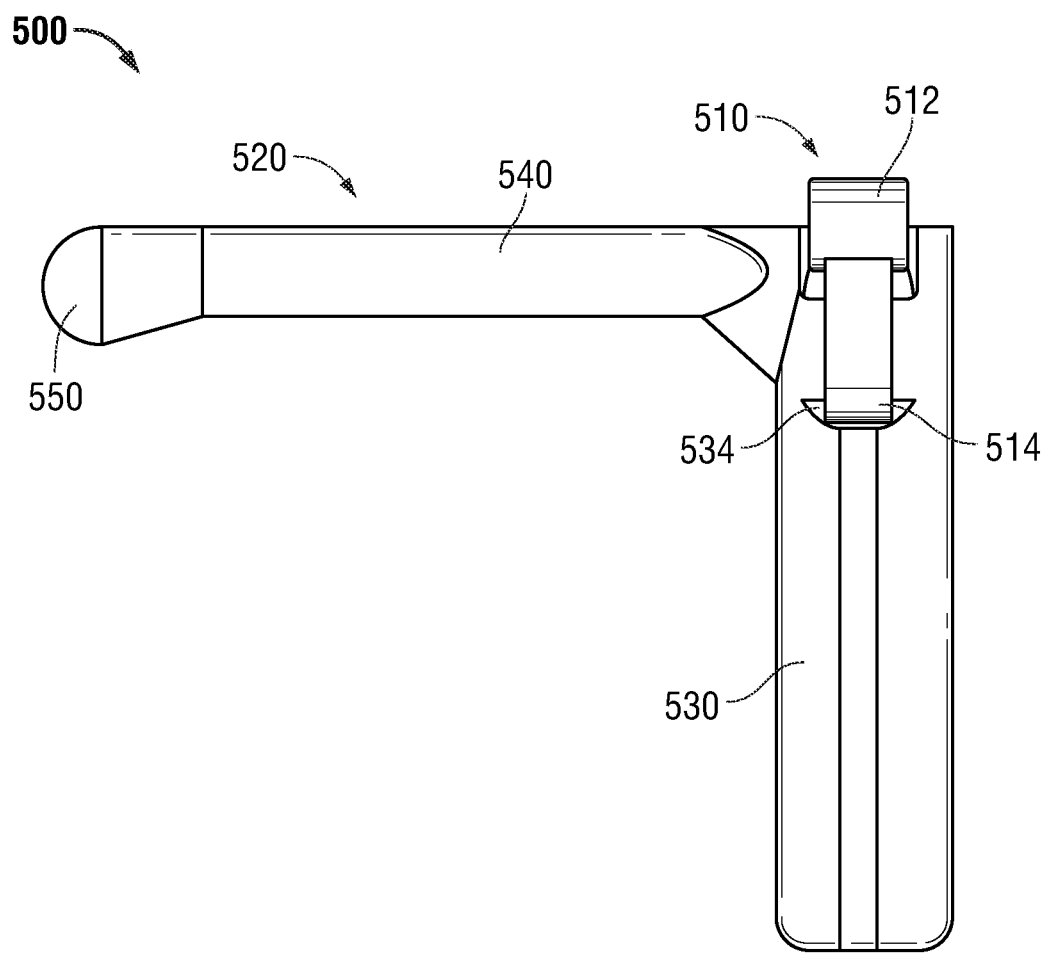
FIG. 4C is a side view of the guide instrument of FIG. 4A including the guide piece assembled on the body.

Referring to FIGS. 4A-4C, another guide instrument provided in accordance with the present disclosure is shown generally identified by reference numeral 500. Guide instrument 500 includes a guide piece 510 and a body 520. Guide piece 510 may be releasably engagable with body 520 (as shown) although integrated configurations are also contemplated. Body 520 includes a proximal handle 530 and a shaft 540 extending distally from proximal handle 530. Body 520 may be configured as an ultrasound device and, thus, may further include an ultrasound sensor assembly 550 disposed at a distal end of shaft 540. Ultrasound sensor assembly 550 may be configured similar to and/or include any of the features of ultrasound sensor assembly 330 (FIGS. 1 and 2), as detailed above.

Proximal handle 530 of body 520 is shown having a pistol-style grip, although other handle configurations are also contemplated as are non-handle configurations, e.g., for mounting body 520 on and/or attaching body 520 to a surgical robot arm. A cable (not shown) may extend from proximal handle 530 to connect ultrasound sensor assembly 550 to an ultrasound console (not shown), e.g., via wires (not shown) extending from ultrasound sensor assembly 550 through shaft 540, proximal handle 530, and the cable, although battery-powered configurations are also contemplated. Proximal handle 530 of body 520 further includes a saddle 532 disposed at an upper end thereof and an engagement notch 534 disposed on either side of saddle 532 at the upper end of proximal handle 530.

Shaft 540 of body 520 extends in a generally perpendicular orientation from the upper end of proximal handle 530, although other angles are also contemplated. Shaft 540 of body 520 defines a longitudinal recess 544 extending from a proximal end of shaft 540 distally along at least a portion of the length of shaft 540. Longitudinal recess 544 may define a semi-cylindrical configuration or any other suitable configuration and is configured to receive a portion of the instrument configured for coupling with guide instrument 500 to align and guide the instrument relative to body 520.

Guide piece 510 includes a head 512 and a pair of engagement tangs 514 extending from either side of head 512. Tangs 514 are configured to releasably engage engagement notches 534 of body 520, e.g., in snap-fit engagement, to secure guide piece 510 relative to body 520. Head 512 defines a guide aperture 516 that aligns with longitudinal recess 544 of body 520 when guide piece 510 is engaged with body 520. Guide instrument 500 is configured to telescopically receive, through guide aperture 516 and longitudinal recess 544, an instrument such that, similarly as detailed above with respect to guide instrument 300 (FIGS. 1 and 2), rotation and axial translation of the instrument relative to guide instrument 500 is permitted while transverse motion and tilting of the instrument relative to guide instrument 500 are substantially constrained. Thus, the instrument, when inserted through aperture 516 and longitudinal recess 544, is only permitted to rotate relative to guide instrument 500 or axially translate through guide instrument 500.

Turning to FIGS. 5-9, provided in accordance with the present disclosure are tracking devices, systems and methods for tracking relative translational and rotational motion of one surgical instrument (e.g., one of instruments 100, 200, or any other suitable surgical instrument) relative to another surgical instrument (e.g., one of instruments 200, 300, 400, 500, or any other suitable surgical instrument).

Figure 5:
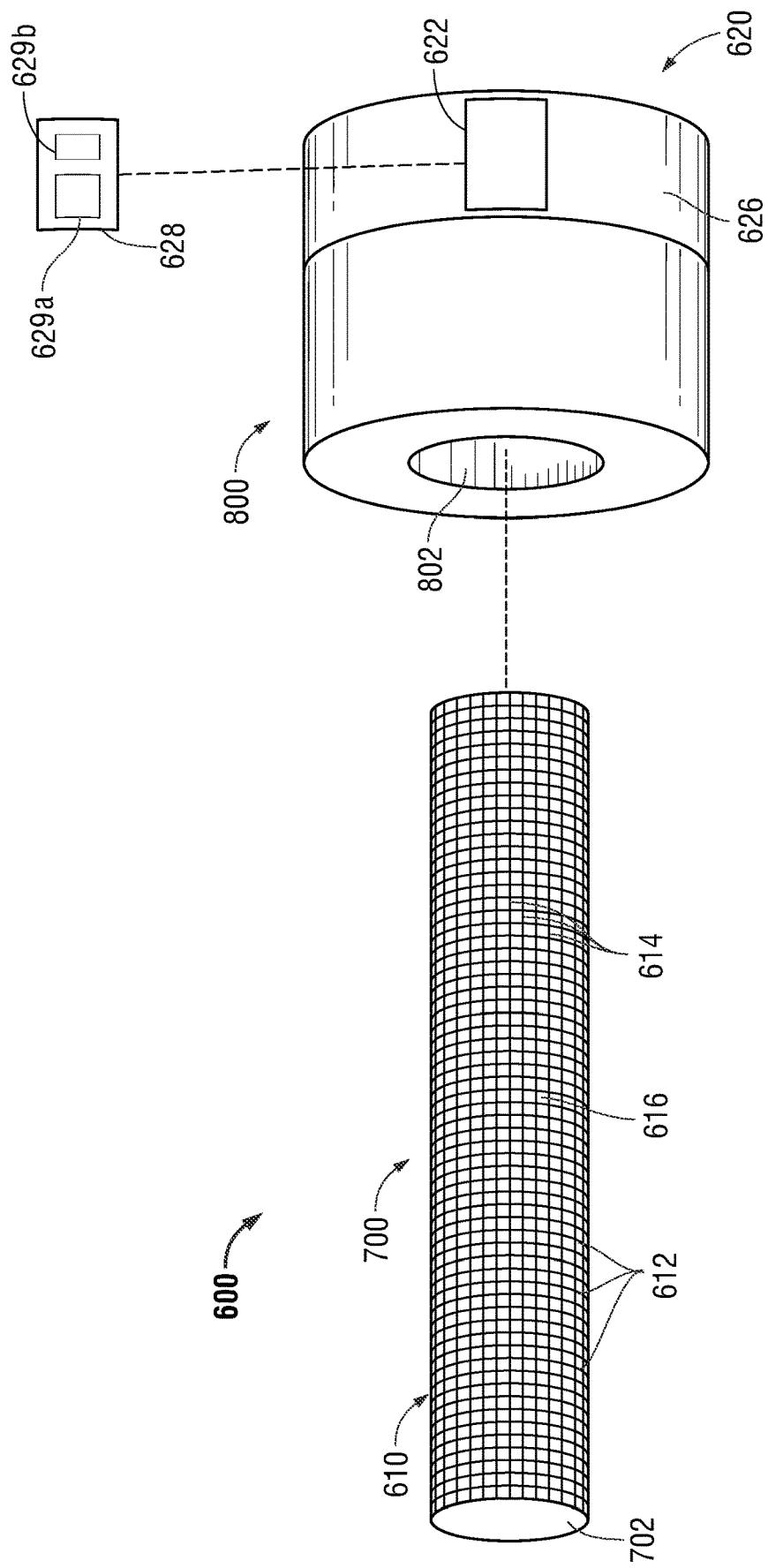
FIG. 5 is a perspective view of a tracking system in accordance with the present disclosure configured to track a first surgical instrument relative to a second surgical instrument.

With reference to FIG. 5, a tracking system 600 provided in accordance with the present disclosure includes a tracking pattern 610 and a tracking sensor assembly 620.

Tracking pattern 610 is disposed on a surgical instrument 700 and, more specifically, on a substantially cylindrical portion 702 of surgical instrument 700, which may represent, for example: a portion of shaft 120 of surgical instrument 100 (FIG. 1); a portion of elongated tubular member 202 of surgical instrument 200 (FIG. 1); etc. Tracking pattern 610 may be permanently disposed on surgical instrument 700, e.g., via providing tracking pattern 610 directly on surgical instrument 700, or may be removable from surgical instrument 700, e.g., tracking pattern 610 may be defined on a sleeve configured for positioning about surgical instrument 700, a sticker configured to adhere to surgical instrument 700, etc.

Tracking pattern 610 includes a plurality of longitudinal markers 612 longitudinally spaced at pre-determined (and, in aspects, constant) intervals and extending circumferentially about tracking pattern 610, and a plurality of rotational markers 614 circumferentially spaced at pre-determined (and, in aspects, constant) intervals and extending longitudinally along tracking pattern 610. As shown in FIG. 5, markers 612, 614 may be configured as lines forming a grid extending about the outer substantially cylindrical surface of portion 702 of surgical instrument 700, although other suitable patterns of markers 612, 614 and/or configurations (e.g., symbols, dots, etc.) of markers 612, 614 are also contemplated.

Markers 612, 614 may be painted, deposited, printed, etched, molded, sprayed, sputtered, or otherwise formed on surgical instrument 700 or a component (e.g., a sleeve or a sticker) configured to attach to surgical instrument 700. In aspects, tracking pattern 610 further includes a background 616 that contrasts with markers 612, 614, although in other aspects the underlying surgical instrument 700 and/or component functions as the contrast background 616.

Markers 612, 614 are configured to be detected via one or more sensors when markers 612, 614 move past the sensor(s) or otherwise intersect a sensing region associated with the sensor(s). More specifically, markers 612, 614 may be configured to be detected by optical sensors and, thus, are optically distinct, e.g., in color, reflectance, etc. from background 616, thus enabling the optical sensor to detect the presence of a marker 612, 614. In aspects, markers 612, 614 are also optically distinct from one another to enable an optical sensor to distinguish between markers 612, 614. In addition, longitudinal markers 612 may be optically distinguished from other longitudinal markers 612 and/or rotational markers 614 may be optically distinguished from other rotational markers 614.

In other aspects, markers 612, 614 may be configured to be detected by magnetic sensors and, thus, are electromagnetically distinct from background 616, e.g., wherein markers 612, 614 are magnetic and background 616 is not, vice versa, or where markers 612, 614 define a first electromagnetic property and background 616 defines a second, different electromagnetic property, thus enabling the magnetic sensors to detect the presence of a marker 612, 614. In such aspects, markers 612, 614 may also be electromagnetically distinct from one another. In addition, longitudinal markers 612 may be electromagnetically distinguished from other longitudinal markers 612 and/or rotational markers 614 may be electromagnetically distinguished from other rotational markers 614.

In still other aspects, markers 612, 614 may be configured to be detected by proximity sensors and, thus, are physically distinct from background 616, e.g., wherein markers 612, 614 protrude from or are recessed relative to background 616, thus enabling the proximity sensor to detect the presence of a marker 612, 614. In such aspects, markers 612, 614 may also be physically distinct from one another, e.g., via protruding or being recessed more or less relative to one another or where one protrudes and the other is recessed. In addition, longitudinal markers 612 may be physically distinguished from other longitudinal markers 612 and/or rotational markers 614 may be physically distinguished from other rotational markers 614.

Other suitable configurations of markers 612, 614 relative to background 616 (and, in aspects, one another) to enable detection thereof via different sensors are also contemplated. Further, in aspects, markers 612 may be configured to be detected by a first type of sensor while markers 614 are configured to be detected by a second, different type of sensor.

Continuing with reference to FIG. 5, sensor assembly 620 is associated with a surgical instrument 800 configured to operably receive cylindrical portion 702 of surgical instrument 700. More specifically, surgical instrument 800 includes a passage 802 (e.g., an opening, channel, aperture, lumen, etc.) configured to receive cylindrical portion 702 of surgical instrument 700, permitting rotation and translation of cylindrical portion 702 of surgical instrument 700, and constraining cylindrical portion 702 of surgical instrument 700 in at least one other degree of freedom. For example, surgical instrument 800 and passage 802 thereof may represent: working channel 204 of instrument 200 (FIG. 1); longitudinal lumen 340 of instrument 300 (FIG. 1); the space defined between rails 404 of instrument 400 (FIG. 3); or aperture 516 of instrument 500 (FIG. 4). Sensor assembly 620, more specifically, may be integrally formed with surgical instrument 800 or may be releasably engagable therewith. In either configuration, sensor assembly 620 may be disposed along passage 802 or at an end (adjacent or spaced-apart) of passage 802.

Sensor assembly 620 includes one or more sensors 622 disposed within a base 626 or integrated into surgical instrument 800. Further, processing electronics 628 may likewise be disposed within base 626 or integrated into surgical instrument 800, or may be remotely disposed (e.g., on or within a console) and electrically coupled to sensors 622 via a wired or wireless connection. Each sensor 622 or set of sensors 622 is configured to detect markers 612, 614 as markers 612, 614 move past the sensor 622 or otherwise intersect a sensing region associated with the sensor 622. Sensors 622, more specifically, are positioned to detect markers 612 as cylindrical portion 702 of surgical instrument 700 is longitudinally translated through and relative to passage 802 of surgical instrument 800 and to detect markers 614 as cylindrical portion 702 of surgical instrument 700 is rotated within and relative to passage 802 of surgical instrument 800. Sensors 622 may thus be directed inwardly towards passage 802, e.g., in configurations where sensor assembly 620 is disposed along passage 802, or may be directed inwardly towards an extension volume of passage 802, e.g., in configurations where sensor assembly 620 is disposed at an end of passage 802. In either configuration, the sensing regions associated with sensors 622 extend, e.g., transversely, through passage 802 (or a volume extension of passage 802), thereby enabling detection of markers 612, 614 as cylindrical portion 702 of surgical instrument 700 is moved relative to passage 802 of surgical instrument 800.

Depending upon the configuration of markers 612, 614, the one or more sensors 622 of sensor assembly 620 may be optical sensors, magnetic sensors, proximity sensors, combinations thereof, or any other suitable sensors or combinations of sensors to detect markers 612, 614.

Turning now to FIGS. 6A and 6B, in use, as cylindrical portion 702 of surgical instrument 700 is translated longitudinally through passage 802 of surgical instrument 800, one or more of the sensors 622 of sensor assembly 620 detects the longitudinal markers 612 of pattern 610 moving past the sensor(s) 622. With additional reference to FIG. 5, the one or more sensors 622 are configured to communicate these detections (e.g., in the form of counts or other suitable signals) to processing electronics 628, which may include a processor 629a and memory 629b (e.g., a non-transitory computer-readable storage medium) storing instructions to be executed by processor 629a to process the detection signals received form sensor(s) 622. Processing electronics 628 may also include other suitable electronics such as, for example, an input/output (not explicitly shown) to enable communication with sensors 622 (via wired or wireless connection) and/or other devices, and/or, in aspects where processing electronics 628 are incorporated on or in base 626, a power source such as a battery (not explicitly shown). Processing electronics 628 are configured to count the number of markers 612 detected based upon the signal received from sensor(s) 622 and, given the known longitudinal spacing of the markers 612, determine the longitudinal distance cylindrical portion 702 of surgical instrument 700 has translated through passage 802. Likewise, by determining the rate at which the markers 612 are detected (e.g., where the signals provided by sensors 622 to processing electronics 628 are timestamped or include timestamp information), the speed of longitudinal translation of cylindrical portion 702 of surgical instrument 700 through passage 802 can also be readily determined by processing electronics 628. Markers 612 may include different proximal and distal edges (or other suitable differences) to further enable determination of a direction of translation of cylindrical portion 702 of surgical instrument 700 through passage 802. Additionally, or alternatively, as detailed below, the use of multiple sensors 622 enables directional tracking.

Referring to FIGS. 7A and 7B, in use, as cylindrical portion 702 of surgical instrument 700 is rotated within and relative to passage 802 of surgical instrument 800, one or more of the sensors 622 of sensor assembly 620 detects the rotational markers 614 of pattern 610 moving past the sensor(s) 622. By counting the number of markers 614 detected, and given the known angular spacing of the markers 614, the angular rotation of cylindrical portion 702 of surgical instrument 700 relative to passage 802 can be readily determined. Likewise, by detecting the rate at which the markers 614 are detected, the rotational speed of cylindrical portion 702 of surgical instrument 700 within passage 802 can also be readily determined. Markers 614 may include different clockwise-facing and counterclockwise-facing edges (or other suitable differences) to further enable determination of a direction of rotation of cylindrical portion 702 of surgical instrument 700 within passage 802. Additionally, or alternatively, as detailed below, the use of multiple sensors 622 enables directional tracking.

Figure 8A:
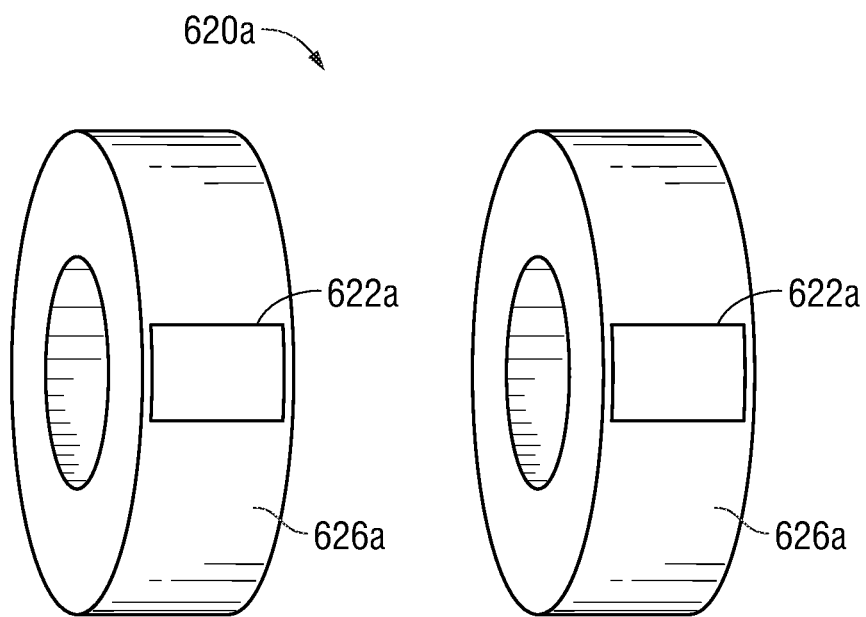
Figure 8B:
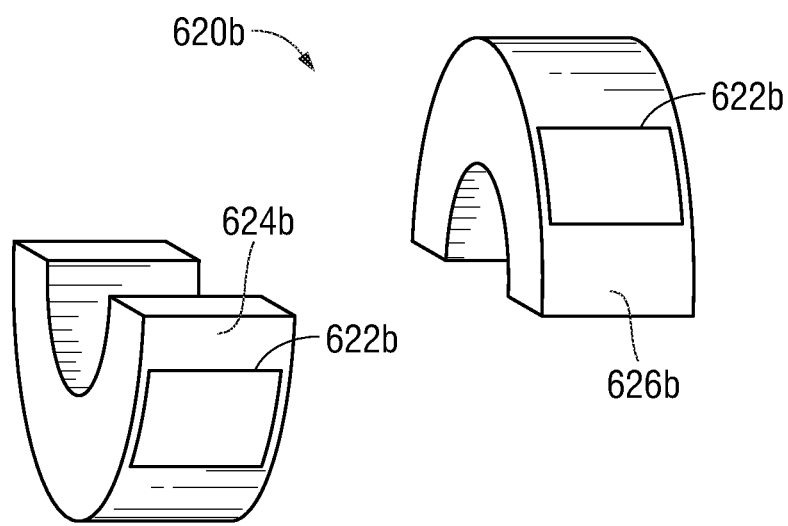

Turning to FIGS. 8A-8E, and with initial reference to FIG. 8A, in aspects, the sensor assembly 620a includes two bases 624a, 626a each including one or more sensors 622a. Bases 624a, 626a are longitudinally spaced-apart from one another such that the sensors 622a are likewise longitudinally spaced-apart from one another. Thus, in use, the direction of translation can be determined depending upon which sensor 622a detects a particular marker 612 or set or markers 612 first. Referring to FIG. 8B, similarly with respect to rotation, the sensor assembly 620b may include two bases 624b, 626b each including one or more sensors 622b. Bases 624b, 626b are circumferentially spaced-apart from one another such that the sensors 622b are likewise circumferentially spaced-apart from one another. Thus, in use, the direction of rotation can be determined depending upon which sensor 622b detects a particular marker 614 or set or markers 614 first.

Referring to FIG. 8C, rather than two bases as with sensor assembly 620a (FIG. 8A), sensor assembly 620c may include longitudinally-spaced sensors 622c disposed within a single base 626c but may otherwise operate similar to sensor assembly 620a (FIG. 8A). Likewise with respect to FIG. 8D, rather than two bases as with sensor assembly 620b (FIG. 8B), sensor assembly 620d may include circumferentially-spaced sensors 622d disposed within a single base 626d but may otherwise operate similar to sensor assembly 620b (FIG. 8B). Combinations of the above-noted configurations in FIGS. 8A-8D are also contemplated.

Turning to FIG. 8E, rather than including a base, sensor assembly 620e may be integrated into a portion of surgical instrument 800. More specifically, sensors 622e may be disposed on or within surgical instrument 800 and operably positioned relative to passage 802 in any of the manners detailed above, combinations thereof, or in any other suitable manner to enable translational and/or rotational tracking of a surgical instrument inserted through passage 802, e.g., surgical instrument 700 (FIGS. 5-7B).

With reference to FIG. 9, in aspects, rather than the pattern being associated with the inner or guided instrument and the sensor assembly associated with the outer or guiding instrument, this configuration may be reversed. That is, a pattern 910 including markers 912, 914 (and, in aspects, a contrast background 916) including any of the aspects and features detailed hereinabove may be provided on an interior surface 1004 of a surgical instrument 1000 (e.g., a cylindrical interior surface 1004 of surgical instrument 1000) defining a passage 1002 at least partially through the surgical instrument 1000 while the one or more sensors 922 including any of the aspects and features detailed hereinabove are coupled to or integrated with a surgical instrument 1100 (e.g., a cylindrical portion 1104 of surgical instrument 1100) configured for insertion at least partially through the passage 1002 of the surgical instrument 1000.

Referring generally to FIGS. 5-9, in configurations where the surgical instrument to be tracked is configured to move transversely and/or tilt relative to the guide instrument, additional markings or configurations of the markings may be provided to enable tilt and/or transverse tracking.

Further, regardless of the direction and/or motion to be tracked, the sensor assemblies and sensors of the present disclosure may be configured for positioning at known locations relative to the guide instrument and/or any other suitable reference point and the markers may be located at known positions on the surgical instrument to be tracked. In this manner, the position and orientation of a surgical instrument to be tracked (or portion thereof, such as a distal end or end effector) may be determined relative to the guide instrument and/or reference point. In particular, with the guide instrument positioned at a particular anatomical location or located within a field of view, the position and orientation of the surgical instrument to be tracked (or portion thereof) may be determined relative to the anatomical location or position within the field of view such that, even if the surgical instrument (or portion thereof) to be tracked is not visible, the position thereof can be readily determined and visualized.

The determination of an amount of longitudinal translation and/or rotation of an instrument to be tracked relative to a guide instrument or a reference point, and/or the determination of a longitudinal and/or rotational position of the instrument to be tracked relative to the guide instrument or the reference point based on the amount of longitudinal translation and/or rotation, as in any of the above aspects, may be performed by suitable electronics (e.g., processing electronics 628 (FIG. 5) and/or other suitable electronics including one or more processors and associated memories storing instructions). The electronics (e.g., processing electronics 628 (FIG. 5)), in any of the above aspects, may be associated with or incorporated into: the sensor assembly; an instrument such as, for example, the instrument to be tracked, the guide instrument, or any other suitable instrument or combinations of instruments; a console; a (wired or wirelessly) connected computer such as, for example, a smartphone, tablet, desktop computer, laptop computer, server (a cloud-based server, a local server, or a remote server); combinations thereof; or in any other suitable manner. In aspects, the electronics (e.g., processing electronics 628 (FIG. 5)) are implemented across two or mode assemblies, instruments, and/or computers communicatively coupled to one another.

Further, as noted above, the determined amount of movement and/or position by the electronics (e.g., processing electronics 628 (FIG. 5)) may be output to different electronics or may be utilized by the same electronics to provide a suitable output such as, for example: a warning (visual, audible, tactile, combinations thereof, etc.) where the determined amount of movement exceeds a threshold and/or where the position exceeds a boundary, extends outside a field of view, is sufficiently approximated relative to another instrument or tissue of interest, etc.; a visual display of the determined amount of movement and/or position including a trajectory or path based on the determined movement and position; a feedback signal to a control device (such as an energy generator to control the application or cessation of energy, a motion control device such as a robot to move or stop movement of an instrument, or other suitable control device); and/or any other suitable output.

While several aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed is:

1. A system for surgical instrument tracking, comprising:
a pattern on a first surgical instrument, the pattern having a plurality of tracking markers, the plurality of tracking markers including a plurality of first markers and a plurality of second markers;
a sensor assembly configured to operably couple to a second surgical instrument, the sensor assembly including at least one sensor configured to detect multiple tracking markers of the plurality of tracking markers, yielding detected multiple tracking markers including at least one first marker of the plurality of first markers and at least one second marker of the plurality of second markers; and
electronics coupled to the sensor assembly and configured to determine, based on the detected multiple tracking markers, each of: longitudinal translation of the first surgical instrument relative to the second surgical instrument, axial rotation of the first surgical instrument relative to the second surgical instrument, and off-axis tilt of the first surgical instrument relative to the second surgical instrument.

2. The system according to claim 1, wherein the at least one sensor includes:
at least one first sensor configured to detect the at least one first marker of the plurality of first markers; and
at least one second sensor configured to detect the at least one second marker of the plurality of second markers.

3. The system according to claim 1, wherein the at least one sensor is an optical sensor, and wherein the plurality of first markers are optically distinct from the plurality of second markers.

4. The system according to claim 1, wherein the at least one sensor includes:
at least two first sensors, each of the at least two first sensors configured to detect the at least one first marker of the plurality of first markers, wherein the at least two first sensors are longitudinally spaced relative to one another.

5. The system according to claim 4, wherein the at least two first sensors enable determination, by the electronics, of a direction of the longitudinal translation of the first surgical instrument relative to the second surgical instrument.

6. The system according to claim 1, wherein the at least one sensor includes:
at least two second sensors, each of the at least two second sensors configured to detect the at least one second marker of the plurality of second, wherein the at least two second sensors are circumferentially spaced relative to one another.

7. The system according to claim 6, wherein the at least two second sensors enable determination, by the electronics, of a direction of the axial rotation of the first surgical instrument relative to the second surgical instrument.

8. A surgical system for surgical instrument tracking, the surgical system comprising:
a first surgical instrument including a pattern having a plurality of first markers arranged for detection in response to longitudinal translation of the first surgical instrument and a plurality of second markers arranged for detection in response to rotation of the first surgical instrument;
a second surgical instrument configured to guide the first surgical instrument such that the first surgical instrument is permitted to translate longitudinally and rotate relative to the second surgical instrument, and such that the first surgical instrument is constrained relative to the second surgical instrument in at least one other degree of freedom, the second surgical instrument including an imaging assembly configured to image a field of view at an internal surgical site;
a sensor assembly operably coupled to the second surgical instrument, the sensor assembly including at least one sensor configured to detect at least one first marker of the plurality of first markers, thereby enabling determination of longitudinal translation of the first surgical instrument relative to the field of view at the internal surgical site; and
detect at least one second marker of the plurality of second markers, thereby enabling determination of rotation of the first surgical instrument relative to the field of view at the internal surgical site.

9. The surgical system according to claim 8, wherein the sensor assembly is integrated into the second surgical instrument.

10. The surgical system according to claim 8, wherein the sensor assembly is removably coupled to the second surgical instrument.

11. The surgical system according to claim 8, wherein the at least one sensor includes:
at least one first sensor configured to detect the at least one first marker of the plurality of first markers; and
at least one second sensor configured to detect the at least one second marker of the plurality of second markers.

12. The surgical system according to claim 8, wherein the at least one sensor includes:
at least two first sensors, each of the at least two first sensors configured to detect the at least one first marker of the plurality of first markers; and
at least two second sensors, each of the at least two second sensors configured to detect the at least one second marker of the plurality of second.

13. The surgical system according to claim 8, wherein at least one of:
the at least two first sensors enable determination of a direction of the longitudinal translation of the first surgical instrument relative to the second surgical instrument; or
the at least two second sensors enable determination of a direction of the rotation of the first surgical instrument relative to the second surgical instrument.

14. The surgical system according to claim 8, wherein the at least one sensor is an optical sensor and wherein the plurality of first markers are optically distinct from the plurality of second markers.

15. The surgical system according to claim 8, wherein the second surgical instrument defines a passage configured to receive at least a portion of the first surgical instrument, and wherein the first surgical instrument is configured to longitudinally translate and rotate within and relative to the passage of the second surgical instrument.

16. The surgical system according to claim 15, wherein a sensing region of each of the at least one sensors intersects the passage or an extension volume of the passage.

17. The surgical system according to claim 16, wherein the pattern is disposed on an exterior cylindrical surface of the first surgical instrument.

18. A method of surgical instrument tracking, the method comprising:
detecting a plurality of tracking markers associated with a first surgical instrument, wherein the detecting includes detecting at least one first marker of the plurality of tracking markers with at least one first sensor associated with a second surgical instrument and detecting at least one second marker of the plurality of tracking markers with at least one second sensor associated with the second surgical instrument; and determining, based on the detecting of the plurality of tracking markers, each of: longitudinal translation of the first surgical instrument relative to the second surgical instrument, axial rotation of the first surgical instrument relative to the second surgical instrument, and off-axis tilt of the first surgical instrument relative to the second surgical instrument.

19. The method according to claim 18, wherein:

determining the longitudinal translation of the first surgical instrument relative to the second surgical instrument includes determining longitudinal translation of the first surgical instrument through a passage defined by the second surgical instrument; and determining the rotation of the first surgical instrument relative to the second surgical instrument includes determining rotation of the first surgical instrument within the passage defined by the second surgical instrument.

20. The method according to claim 18, further comprising at least one of:

determining a direction of the longitudinal translation of the first surgical instrument relative to the second surgical instrument; or determining a direction of the rotation of the first surgical instrument relative to the second surgical instrument.

* * * * *